United States Patent
Mayhew et al.

(10) Patent No.: US 7,653,060 B2
(45) Date of Patent: Jan. 26, 2010

(54) SYSTEM AND METHOD FOR IMPLEMENTING ASI OVER LONG DISTANCES

(76) Inventors: David Mayhew, 159 Pleasant St., Northborough, MA (US) 01532; Todd Comins, 34 Abbott La., Chelmsford, MA (US) 01824

( * ) Notice: Subject to any disclaimer, the term of this patent is extended or adjusted under 35 U.S.C. 154(b) by 567 days.

(21) Appl. No.: 11/235,346

(22) Filed: Sep. 26, 2005

(65) Prior Publication Data

US 2007/0071005 A1   Mar. 29, 2007

(51) Int. Cl.
   *H04L 1/00*   (2006.01)
(52) U.S. Cl. ........................... 370/392; 370/394
(58) Field of Classification Search ............... 370/235, 370/229, 351, 389, 392, 216
   See application file for complete search history.

(56) References Cited

U.S. PATENT DOCUMENTS

| | | | |
|---|---|---|---|
| 5,359,592 A * | 10/1994 | Corbalis et al. | ............. 370/233 |
| 6,996,658 B2 | 2/2006 | Brocco et al. | |
| 7,062,581 B2 | 6/2006 | Brocco et al. | |
| 7,133,955 B2 | 11/2006 | Mayhew et al. | |
| 7,146,452 B2 | 12/2006 | Brocco et al. | |
| 7,155,557 B2 | 12/2006 | Meier | |
| 7,451,282 B2 | 11/2008 | Meier | |
| 7,518,996 B2 | 4/2009 | Mayhew et al. | |
| 2002/0154600 A1 * | 10/2002 | Ido et al. | ............. 370/216 |
| 2004/0015561 A1 | 1/2004 | Mayhew et al. | |
| 2004/0128410 A1 | 7/2004 | Mayhew et al. | |
| 2004/0184442 A1 * | 9/2004 | Jones et al. | ............. 370/351 |
| 2005/0080976 A1 | 4/2005 | Brocco et al. | |
| 2005/0195845 A1 | 9/2005 | Mayhew et al. | |
| 2005/0228952 A1 | 10/2005 | Mayhew et al. | |
| 2005/0259663 A1 * | 11/2005 | Ode et al. | ............. 370/395.4 |
| 2005/0270974 A1 | 12/2005 | Mayhew | |
| 2006/0050691 A1 | 3/2006 | Meier | |
| 2006/0104275 A1 | 5/2006 | Dohm | |
| 2006/0224812 A1 * | 10/2006 | Kapoor et al. | ............. 710/310 |
| 2006/0224920 A1 * | 10/2006 | Rooholamini et al. | ......... 714/25 |
| 2007/0071005 A1 | 3/2007 | Mayhew et al. | |
| 2007/0288824 A1 * | 12/2007 | Yeo et al. | ............. 714/749 |

* cited by examiner

*Primary Examiner*—Chirag G Shah
*Assistant Examiner*—Daniel Mitchell

(57) ABSTRACT

The present invention provides a system and method for utilizing the Advanced Switching network protocol to communicate over long distances, such as multiple kilometers. The present invention utilizes an existing status bit, referred to as the Perishable Bit, within the AS packet header, to reduce the number of packets which must be stored in the retry buffer. This reduces the required size of the retry buffer and simultaneously reduces the latency associated with retransmitting time critical packets after NAKs are received. The receiving device also utilizes the Perishable Bit in determining which packets to accept and which to discard.

15 Claims, 6 Drawing Sheets

SYSTEM AND METHOD FOR IMPLEMENTING ASI OVER LONG DISTANCES

BACKGROUND OF THE INVENTION

Network protocols are standardized methods of moving information, typically in the form of packets, from one node (the source) to another (the destination). There are several different classes of service that can be provided by a network protocol. One such class, known as "best effort", defines the scenario in which information is sent by the source with no guarantee that it is successfully received by the destination. A second class of service also exists, whereby information sent by the source is guaranteed to arrive at the destination. There are a number of methods by which this can be implemented. The most common method is through the use of acknowledgements (also known as ACKs), which are transmissions sent by the destination back to the source indicating that a previous transmission from the source has been successfully received. In the case where an acknowledgement has not been received by the source, or a negative acknowledgement (also known as a NAK) has been received, the source will retransmit the unsuccessfully transmitted packet.

In order for the source to be able to retransmit a previously unsuccessful packet, it must save that packet until it receives an acknowledgement that it has been received. In some implementations, the source is not permitted to send any additional packets until the previously sent packet has been acknowledged. This minimizes the amount of previously sent information that the source must retain. However, it imposes a significant performance impact. Before the source can transmit a second packet, it must wait for the packet to be transmitted to the destination, the destination to process the packet and the acknowledgement to be returned to the source. It is not uncommon for this round trip delay to be in the order of several microseconds. Thus, the source is forced to be idle for a prolonged period of time.

To mitigate this performance impact, many protocols permit the transmission of multiple packets without waiting for receipt of an acknowledgement. Each outgoing packet is given a unique identifier, typically a sequence number. At a later time, the destination sends an acknowledgement to the source, identifying the packet by the sequence number. One such protocol implementing this scheme is ASI (Advanced Switching Interconnect).

ASI is an industry standard protocol, based on the PCI Express specification. Advanced Switching (AS) allows for the standardization of today's proprietary based backplanes. Advanced Switching uses the same physical-link and data-link layers as the PCI Express architecture, taking advantage of the tremendously large ecosystem. AS is a multi-point, peer-to-peer switched interconnect standard offering encapsulation of any protocol, multiple messaging mechanisms, QoS including congestion management, extended high availability features and much more. The ASI specification is written, updated and maintained by the ASI SIG (Special Interest Group) and the current version of the specification can be found at www.asi-sig.org/members/Core AS Rev10.pdf, and is hereby incorporated by reference. Similarly, the PCI Express specification is written, updated and maintained by the PCI SIG and the current specification can be found at www.pcisig.org/members/downloads/specifications/pciexpress/pciexpress base 10a.pdf, and is also hereby incorporated by reference.

Many other network protocols, including ASI, define a retry buffer that resides within the source. This retry buffer saves sent packets until they have been acknowledged by the destination. Once an acknowledgement has been received by the source for a specific packet, that packet can then be discarded from the retry buffer. Many protocols, including ASI, also allow a destination to acknowledge multiple transmitted packets simultaneously. For example, assume that packets with sequence numbers 3, 4, 5, 6, 7 and 8 have all been transmitted. An acknowledgement from the destination, indicating a sequence number of 6 would signify that packets with sequence numbers 3, 4, 5 and 6 had all been successfully received. This reduces the number of acknowledgements that need to be transmitted, thus preserving valuable bandwidth. The receipt of this acknowledgement would also cause the source to discard the packets with sequence numbers 3, 4, 5 and 6 from its retry buffer.

FIG. 1 illustrates a typical flowchart for the processing of ACKs and NAKs by the source. Decision Box 10 compares the sequence number received in the acknowledgement (AckNak_Seq_Num) to the last outgoing sequence number (NEXT_TRANSMIT_SEQ-1). If the sequence number specified by the acknowledgement does not correspond to an unacknowledged packet, the incoming acknowledgement is discarded, as shown in Block 50. The sequence number specified by the acknowledgement is also compared to the last received acknowledgement (ACKD_SEQ), as shown in Decision Box 20. If the sequence number differs from this value by too great an amount, then the incoming acknowledgement is discarded, as shown in Block 50. Decision Boxes 10 and 20 serve to guard against erroneously received acknowledgements, and corrupted sequence numbers.

Decision Box 30 compares the sequence number specified by the incoming acknowledgement (AckNak_Seq_Num) to the last received acknowledgement (ACKD_SEQ). If it is different than the previously received sequence number, the source discards from the retry buffer all packets with sequence numbers indicating that they were transmitted earlier than the received sequence number (AckNak_Seq_Num), as shown in Block 60. The source then stores the newly received sequence number as the last received sequence number (ACKD_SEQ), as also shown in Block 60.

Decision Box 40 then determines whether the an acknowledgement (ACK) or negative acknowledgement (NAK) was received. If a NAK was received, the source resends all unacknowledged packets again, as shown in Block 70. Thus, in order for the above process to function properly, the source must store packets since the last acknowledged packet.

This protocol is very effective, especially in scenarios wherein acknowledgements are sent relatively soon after the transmission of the packet. In fact, most protocols specify a time limit within which an acknowledgement must be sent before it is considered a failed transmission. This time limit is sometimes known as the Replay Timer.

Often times, the specified time limit, or Replay Timer, is a function of the underlying communication link. For example, it is common to calculate the timer limit using the following parameters. The packet transmission delay is the actual physical time required for the packet sent by the source to reach the destination. This time is based solely on the length of the communication link. The packet processing delay is the time required for the destination to interpret the packet and generate an acknowledgement in response. The destination send delay is the time required before the acknowledgement can be transmitted. Often, this time is defined as the amount of time required to transmit the longest packet allowed by the protocol. For example, assume that just as the destination is preparing to send the acknowledgement, it begins transmitting (or receiving) a new packet, and that this packet is the longest allowed by the protocol. The destination must wait until this packet has been sent (or received) before it can transmit the acknowledgement. Finally, there is the acknowledgement transmission delay which is the actual physical time required for the acknowledgement to be sent by the destination and received by the source.

To illustrate these parameters, assume a 100 meter link, operating at 2.5 Gb/s, with a maximum packet size of 2 kilobytes. Furthermore, assume that the network protocol has an efficiency of 80%. The packet transmission delay is given by:

$$100\text{ m} * 5\text{ ns/m} = 500\text{ ns}$$

The processing delay is based solely on the performance of the destination and therefore cannot be calculated here.

The destination send delay is given by:

$$(2\text{ KB} * 8\text{ bits/byte}/0.8)/2.5\text{ Gb/s} = 8000\text{ ns}$$

Finally, the acknowledgement transmission delay is the same as the packet transmission delay, or 500 ns. Thus, the specified time limit or Replay Timer must be greater than 9 microseconds, to account for the packet processing delay at the destination. In the preferred embodiment, there are two timers, the Replay Timer and a second timer in the destination. This second timer, or Ack Latency Timer, specifies the maximum time that the destination may wait before returning an acknowledgement to the sender. This value is preferably less than the value of the Replay Timer. The AS specification suggests recommended time limits for both of these timers, based on maximum payload size and link speed. The specification does allow for multiple packets to be transmitted before an acknowledgement is received.

The size of the retry buffer can then be determined, based on the specified time limit indicated by the Replay Timer. For example, in most protocols, the speed of the communications link is well known. Therefore, the number of bits that can be transmitted during the defined time limit can be defined as:

Number of bits transmitted=link speed*time limit.

However, not all of the bits transmitted are actual data, which needs to be stored in the retry buffer. Often, there is network information, or overhead, associated with each packet. Therefore, the number of actual data bits which are transmitted during the time limit is given by:

Number of data bits=# of bits*protocol efficiency.

This number of data bits defines the minimum size of the retry buffer. Referring to the previous example, to support the communications link described above, the retry buffer must be able to store in excess of:

$$2.5\text{ Gb/s} * 9\text{ µs} * 0.8 = 18000\text{ bits, or 2.25 Kbytes.}$$

Even if the protocol specifies a Replay Timer value that is several times greater than the theoretically minimum value to allow multiple outstanding packets, the amount of storage required is feasible in current semiconductor technologies.

However, this implementation is far less feasible when the length of the communications link is significantly increased. Assume that instead of a 100 meter link, the communications link is instead 5 to 10 kilometers, such as is used for MANs (Metro Area Networks). In this scenario, the packet transmission delay and acknowledgement transmission delay increase from 500 ns each to:

$$10\text{ km} * 5\text{ ns/m} = 50\text{ microseconds each.}$$

Thus, the total specified time limit, or Replay Timer, must be in excess of 108 microseconds. Therefore, the retry buffer must be able to store in excess of:

$$2.5\text{ Gb/s} * 108\text{ µs} * 0.8 = 216000\text{ bits, or 27 Kbytes.}$$

If the speed of the link is increased from 2.5 Gb/s to 10 Gb/s, which is also allowed by the AS specification, the buffer requirements grow to in excess of 100 Kbytes.

In addition to the increased amount of storage required for the retry buffer, there is also significant latency in retransmissions. For example, assume that there is a time critical packet to be sent. Just after this time critical packet is sent, a NAK is received for a packet that was transmitted over 100 microseconds ago. Because of this transmission error, all packets that were received after the offending packet will be rejected by the destination and must be resent by the source. In this situation, the entire contents of the retry buffer must be retransmitted, with the time critical packet being the last packet in the retry buffer. Thus, the time critical packet is forced to wait more than 100 microseconds to be transmitted. Such a large delay is unacceptable for a time critical packet.

Thus, in order to utilize the protocol and architecture of AS to achieve long distance interconnections, the issues of buffer size and latency must be addressed. A system and method is needed to retain the AS protocol, while not requiring the large retry buffers and long retry latencies typically associated with long haul protocols.

SUMMARY OF THE INVENTION

The problems with the prior art have been overcome with the present invention, which provides a system and method for utilizing the Advanced Switching network protocol to communicate over long distances. The present invention utilizes an existing status bit, referred to as the Perishable Bit, within the AS packet header, to reduce the number of packets which must be stored in the retry buffer. This reduces the required size of the retry buffer and simultaneously reduces the latency associated with retransmitting time critical packets after NAKs are received. The receiving device also utilizes the Perishable Bit in determining which packets to accept and which to discard.

DETAILED DESCRIPTION OF THE INVENTION

Transaction Layer Packets are defined in the PCI Express specification, and are used to communicate a variety of different types of information between nodes in the system. TLPs are always preceded by special k-code identifiers, which allow the network device to quickly interpret the incoming packet and process it accordingly. Referring to FIG.

2, TLP 100 are preceded by a k-code known as START TLP and referred to as K27.7 in the PCI Express specification. Each packet begins with this unique code, referred to as the Start TLP K-Code 110. Since the arrival of packets is guaranteed, as opposed to best effort, a two byte sequence number follows the START TLP K-Code. As described earlier, sequence numbers are used to uniquely identify packets, especially for purposes of acknowledging previous transmissions.

The packet then contains two double words, referred to as the AS Route Header 130. The AS Router Header 130 contains information relating to the transmission of the packet through an AS network, and this will be described in greater detail in connection with FIG. 3. Following the Route Header 130 is the packet's main body of information 140. Lastly, the Transaction Layer Packet is complete after the transmission of an End TLP K-Code 150.

Figure 3:
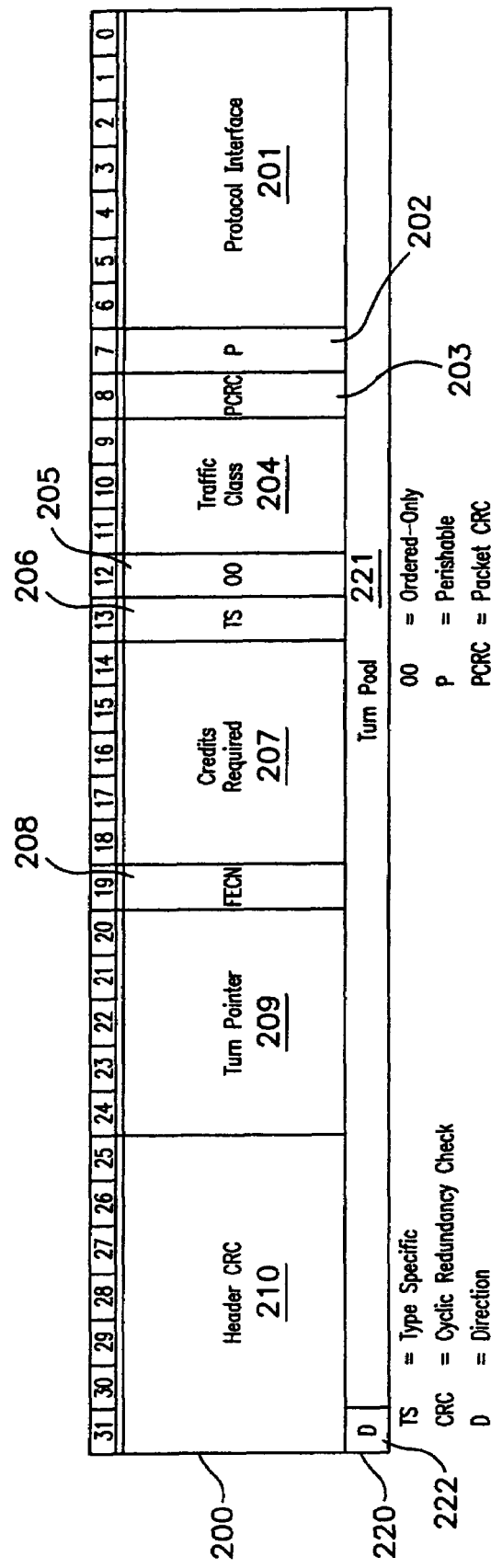
FIG. 3 illustrates a packet route header in accordance with the Advanced Switching specification.

In accordance with the AS specification, all TLPs use an AS Route header, as illustrated in FIG. 3, which defines the type of message and the path it is to travel through the fabric. This header consists of two double words 200 and 220.

First, bits<6:0> of the first double word 200 define the Protocol Interface (PI) field 201. This field represents the various types of packets that can be encapsulated by this header. While 128 possible values are defined, many of these are implementation or vendor specific. Several others are reserved for configuration purposes, such as path building. Bit<7> represents the Perishable bit 202, which, when set, indicates whether the packet can be silently discarded by the destination if it encounters congestion. Bit<8> represents the Packet CRC field 203, which indicates whether a double word of CRC has been appended to the packet's payload. Bits<11:9> represent the traffic class 204 of the associated packet. Bit<12> of double word 200 contains the "Ordered Only" flag 205. In accordance with the specification, there are some classes of traffic which must be delivered in the order in which they were sent. These are referred to as "ordered only" traffic classes. The assertion of this bit indicates that this packet belongs to such a traffic class. Bit<13> represents the Type Specific bit 206. Bits<18:14> represent the Credits Required field 207, which indicates the number of credits that must be available to perform cut-through forwarding of the associated packet. Bit<19> represents the Forward Explicit Congestion Notification (FECN) bit 208. When set, this bit notifies a node to transmit a congestion notification message to the original sender. Bits<24:20> represent the Turn Pointer 209. This field, in conjunction with the Turn Pool field 221 and the Direction flag 222 of double word 220, instructs the receiving device of the action it should take to forward the associated packet. Finally, bits<31:25> of double word 200 contains the header CRC 210, in accordance with the AS specification.

Figure 1:
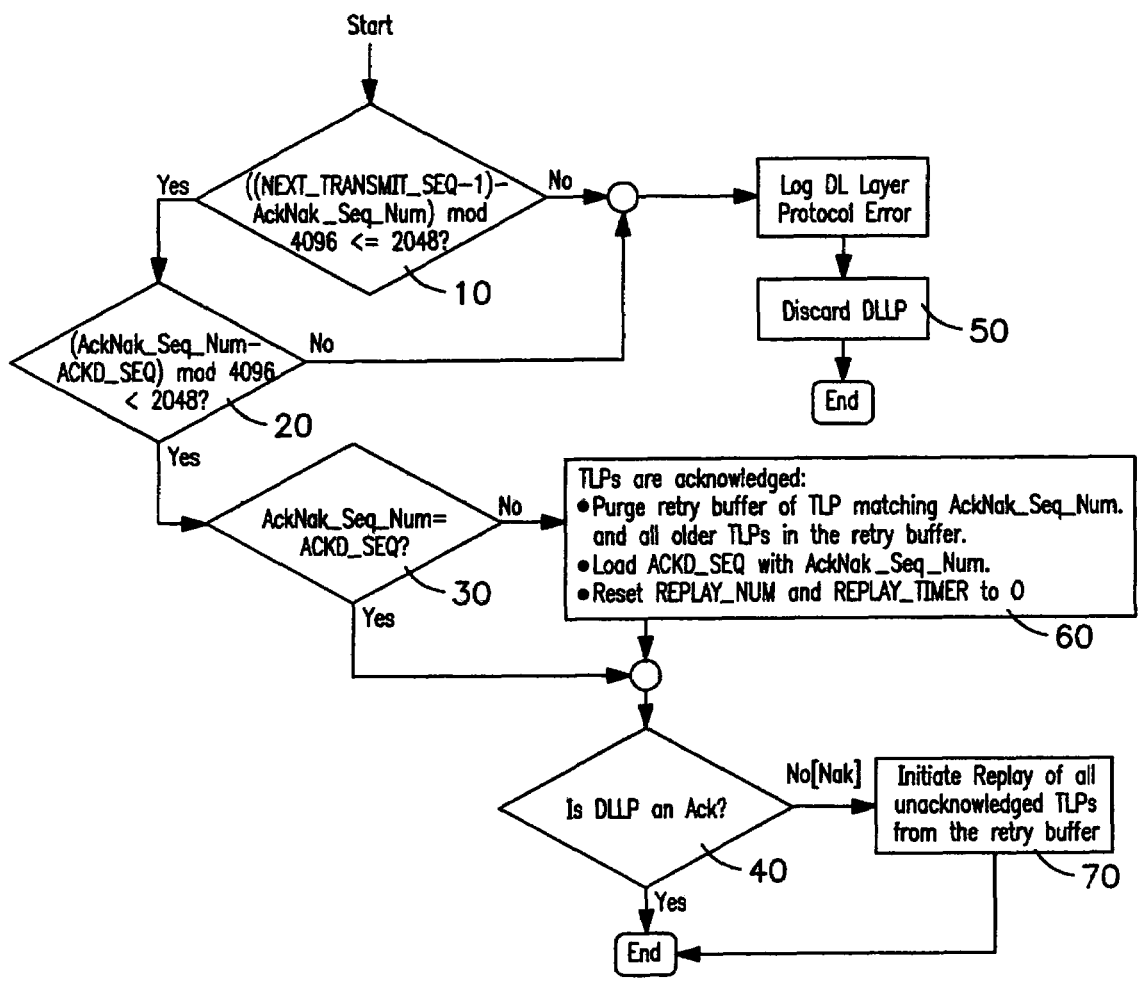
FIG. 1 is a flowchart representing the ACK/NAK processing of AS devices.
Figure 2:
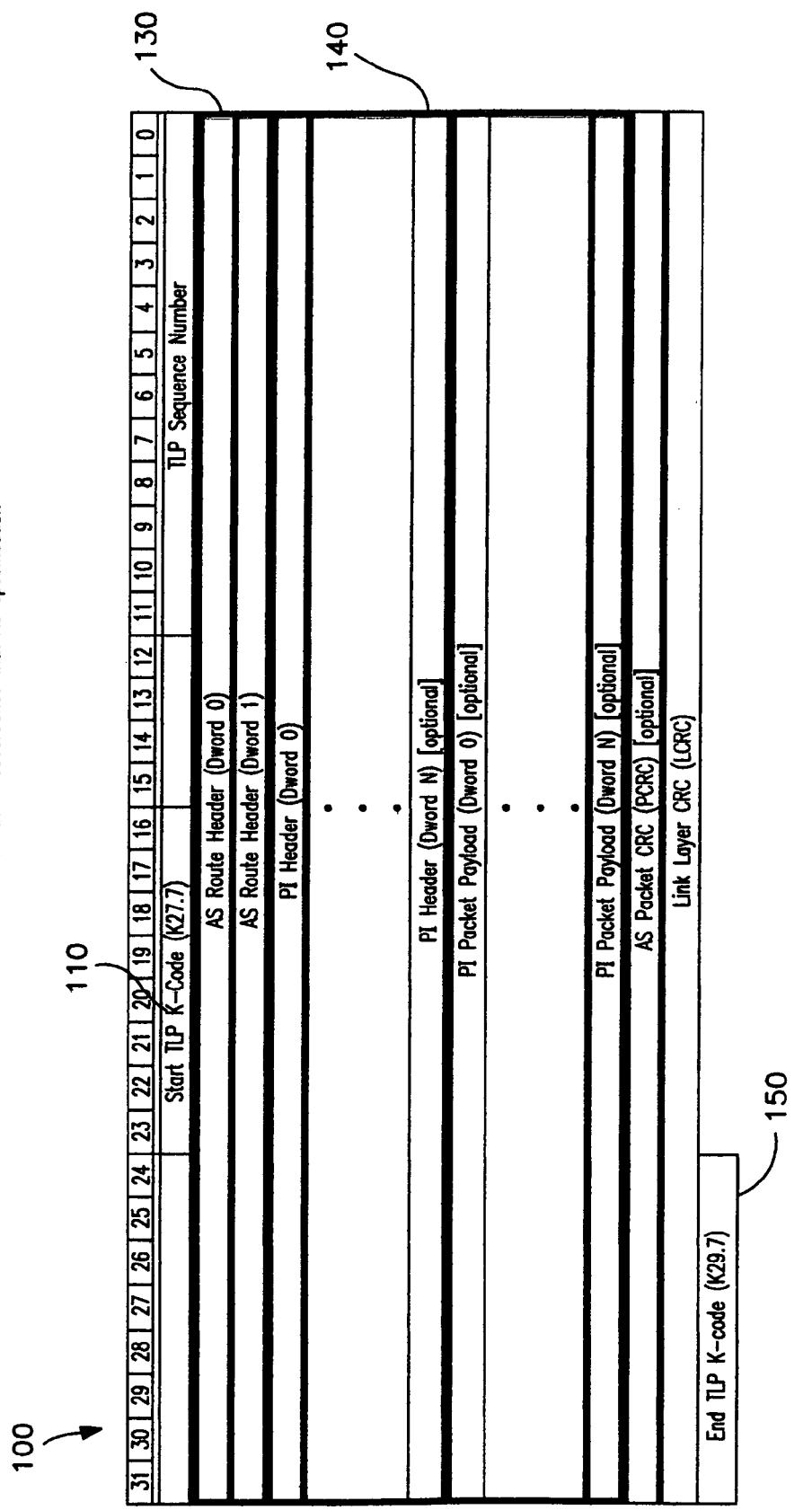
FIG. 2 illustrates a packet format in accordance with the Advanced Switching specification.

As described earlier, the latency between the transmission of a packet and the receipt of the associated ACK or NAK is specified by the Replay Timer. Therefore, AS devices are designed such that each output port has a retry buffer that are large enough to store all of the packets that can be transmitted during this interval. As described in conjunction with FIG. 1, as ACKs are received, the associated packet and any previously transmitted packets stored in the retry buffer are discarded. If a NAK is received, the device retransmits the contents of the retry buffer again, starting with the packet having the sequence number contained in the NAK.

The worst-case scenario for the retransmission latency of a packet is defined as follows. Immediately before the destination attempts to send an NAK, the source begins transmission of the maximum length packet. Thereafter, following the transmission of this packet, a NAK is received by the source for the oldest packet contained in the retry buffer. This NAK arrived after the longest permissible duration (the value contained in the Replay Timer plus the delay incurred due to the transmission of the packet by the source), and the source has been transmitting packets during this entire duration, thereby filling the retry buffer. The destination has been discarding every packet that arrived after the packet to which it responded with a NAK. Thus, the sender must retransmit the entire contents of the retry buffer. Since the sender transmitted packets continuously, this implies that each packet in the retry buffer will suffer a retransmission delay roughly equal to the maximum latency delay. Table 1 illustrates the effect of a NAK on a sequence of packets. In this example, the packet with sequence number 12 failed because of a transmission error. Because of the requirement to receive packets in order, all subsequently transmitted packets (13-18) are automatically rejected until the failed packet is retransmitted.

TABLE 1

| Sequence No. | Type of Packet | Destination Response |
|---|---|---|
| 11 | Non-perishable | ACK |
| 12 | Non-perishable | NAK - transmission error |
| 13 | Perishable | Discarded |
| 14 | Perishable | Discarded |
| 15 | Perishable | Discarded |
| 16 | Non-perishable | Discarded |
| 17 | Perishable | Discarded |
| 18 | Perishable | Discarded |
| 12 | Non-perishable | ACK |
| 13 | Perishable | ACK |
| 14 | Perishable | ACK |
| 15 | Perishable | ACK |
| 16 | Non-perishable | ACK |
| 17 | Perishable | ACK |
| 18 | Perishable | ACK |

It is important to note that each packet that is transmitted contains a "perishable" bit, described above. If the "perishable" bit is asserted in a particular packet, it signifies to the receiver that the packet can be silently discarded if there is congestion. The AS specification also states that "AS does not specify the manner in which congestion is detected. If an implementation determines that a packet with the Perishable bit set will excessively contribute to congestion, the packet may be dropped."

The present invention utilizes this bit, and its accompanying function to allow AS to be used over long distances. There are several major issues associated with extending AS over long distances. These include the maximum value allowed by the Replay Timer, the size of the retry buffer and the retransmission delay.

Most current implementations of AS have Replay Timers that can accommodate values that are in the range of tens of microseconds. To implement AS over longer distances, this timer needs to expand to allow values well over 100 microseconds. This is a simple matter of adding additional bits to the timers, and is readily solved.

However, the last two problems are much more complex and are both related to the increased Replay Timer. The size of the retry buffer in current implementations is directly related to the maximum value of the Replay Timer. Thus, if the time specified by the Replay Timer is substantially increased to accommodate long transmission delays, the retry buffer would be proportionally increased. As stated above, this increase in retry buffer size is impractical in many applications. The value of the Replay Timer also determines the maximum retransmission delay. Thus, by increasing the values allowed by the Replay Timer to accommodate longer transmission delays, the time before any packet will be retransmitted following an error is correspondingly increased.

The present invention utilizes the "perishable" bit to effectively decouple the Replay Timer value from the retry buffer size and the retransmission delay time.

Figure 4:
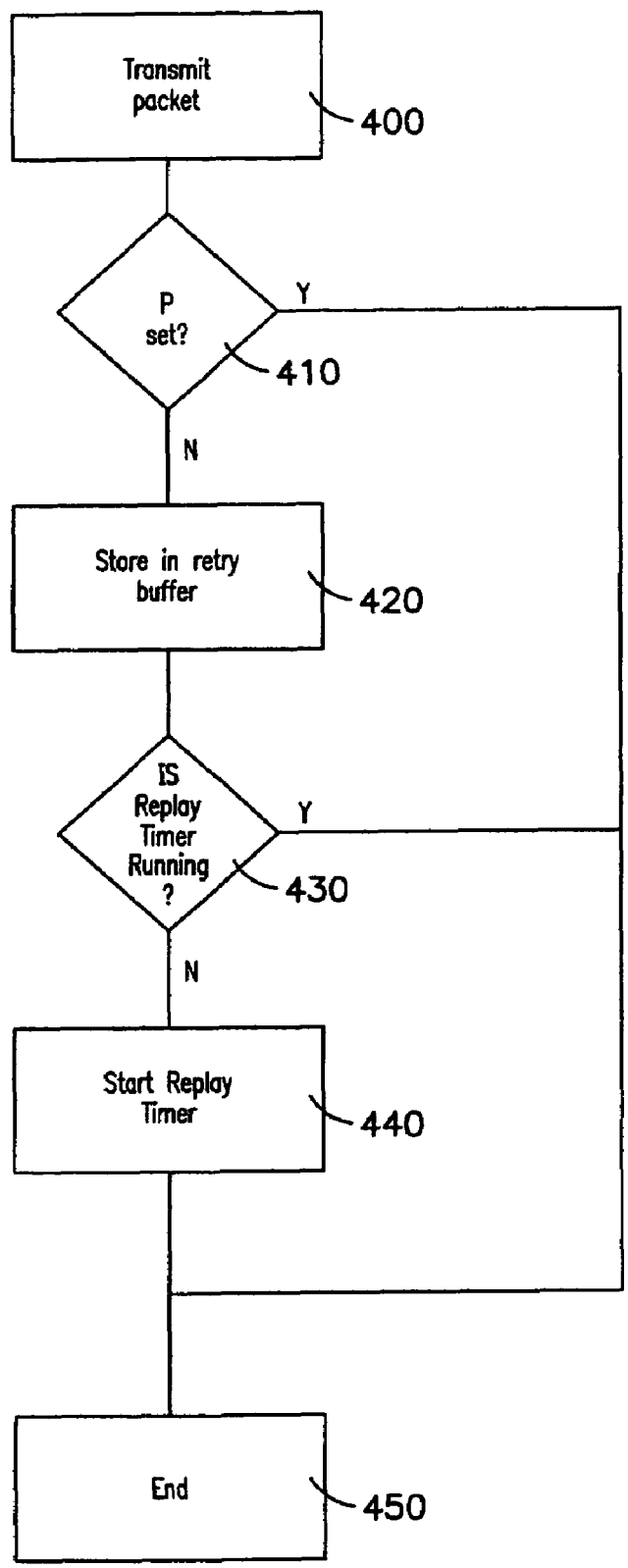
FIG. 4 is a flowchart illustrating a representative embodiment of the sending process.

FIG. 4 shows a simplified flow chart of an exemplary process that the sender follows when transmitting a packet. The sender must include the control means necessary to implement this process. First, the packet is transmitted (as shown in Box 400). After the sender transmits a packet, it checks the state of the "perishable" bit (as shown in Decision Box 410). If this bit is set, it is acceptable for the destination to discard it if sufficient congestion exists. Thus, it can be implied that this packet is non-critical and that its arrival and subsequent processing is not essential. Thus, if its arrival is not essential, it necessarily follows that it is not essential to resend this packet if a transmission error should occur. Therefore, the sender does not store this packet in its retry buffer. Since the packet is not stored in the retry buffer, the sender does not need to start the Replay Timer, since there is nothing to resend. Therefore, no further actions are required of the sender. However, if the packet does not have the perishable bit set, the sender stores the packet in the retry buffer (as shown in Box 420). When the first non-perishable packet is placed in the retry buffer, the Replay Timer is started (as shown in Box 440). The sender repeats this evaluation for each packet that it transmits, only storing the non-perishable packets in the retry buffer, and only restarting the Replay Timer if this is the first packet in the retry buffer.

Figure 5:
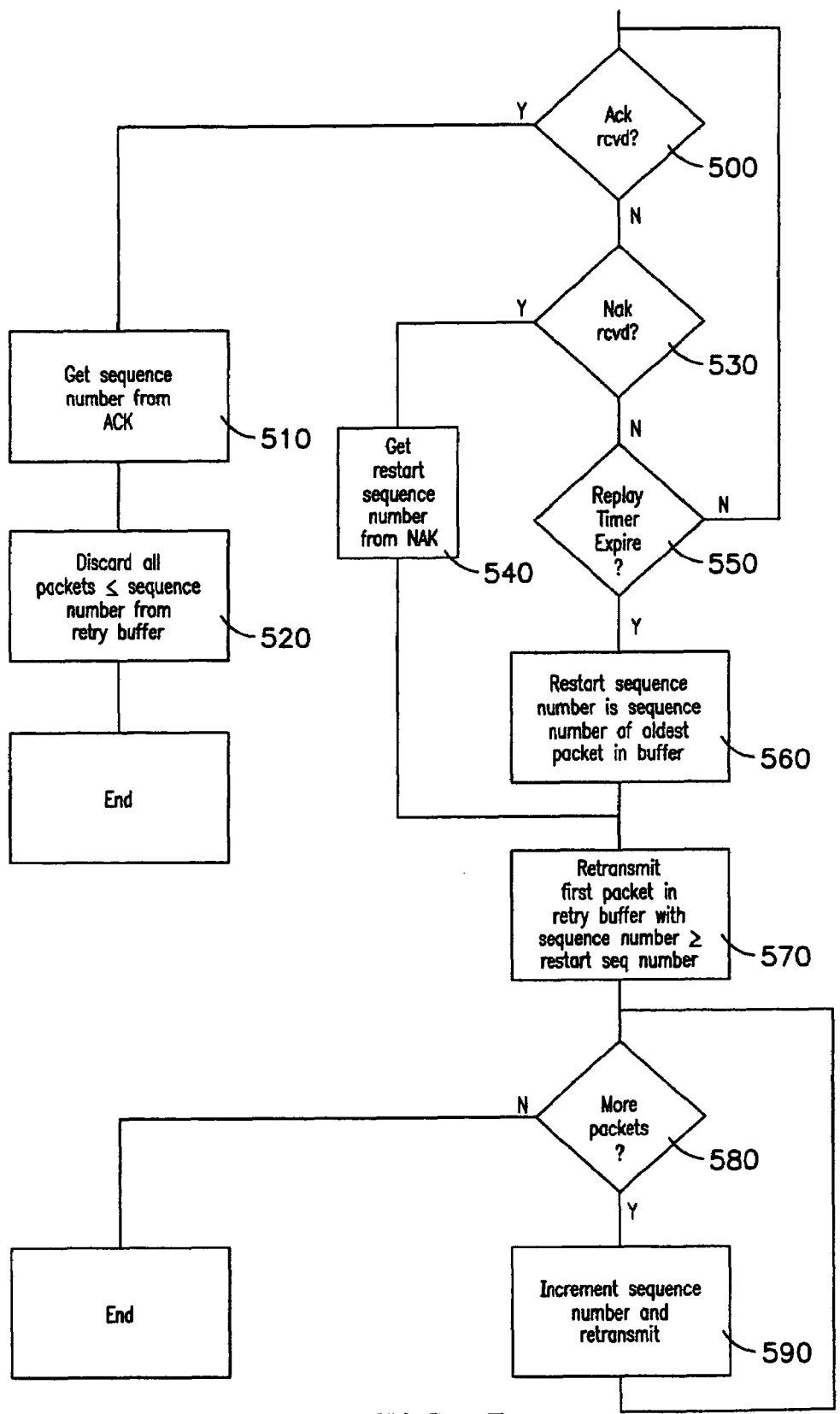
FIG. 5 is a flowchart illustrating a representative embodiment of the sender's actions in response to a NAK or an ACK.

Having explained a process by which the sender transmits packets, an exemplary process by which the sender processes responses from the destination will be described, in conjunction with the flowchart of FIG. 5. The sender first checks to see if an ACK has been received (as shown in Box 500). If it has, the sender obtains the sequence number from the ACK (as shown in Box 510). After sufficient checking has been done to validate the integrity of the ACK, the sender then deletes all packets in the retry buffer with a sequence number less than or equal to that found in the ACK (as shown in Box 520).

If an ACK was not received, the sender then checks to see if a packet was received in error. There are two types of error notifications. The first, which is explicit, is receipt of a NAK as shown in Decision Box 530. If a NAK has been received, the sender obtains the sequence number of the failed packet from the NAK (as shown in Box 540). This number will be used to initiate a retransmission. The sequence number could specify a packet that is not the oldest in the retry buffer. In this scenario, it is assumed that all packets with sequence numbers lower than that contained in the NAK were successfully transmitted. Thus, the older packets are discarded and the retransmission begins with the sequence number identified in the NAK.

The other type of error notification is implicit, and is the expiration of the Replay Timer, which is tested for in Decision Box 550. The timer's expiration indicates that the destination either never received the packet, or the response returned from the destination never arrived at the sender. In either case, all packets in the retry buffer, starting with the oldest, must be retransmitted (as shown in Box 560). The sender then begins to retransmit packets starting at the sequence number obtained above in Boxes 540 or 560. Any packets with sequence numbers lower than this value are discarded, since it is assumed that they were successfully transmitted and received. After this packet has been transmitted, the sender checks if there are other packets still remaining in the retry buffer (as shown in Decision Box 580). If there are, the sender must replace the sequence number currently in the stored packet with a new sequence number. This is required since packets must always be sent with the sequence numbers in consecutive order. When the sender disregards some perishable packets by not placing them in the retry buffer, the sequence numbers of those retained packets may not longer be consecutive. Therefore, the sender must renumber these packets before resending them. Table 2 shows the same sequence of packets used in Table 1, in accordance with the present invention.

TABLE 2

| Sequence Number | Type of Packet | Destination response |
|---|---|---|
| 11 | Non-perishable | ACK |
| 12 | Non-perishable | NAK - transmission error |
| 13 | Perishable | Discarded |
| 14 | Perishable | Discarded |
| 15 | Perishable | Discarded |
| 16 | Non-perishable | Discarded |
| 17 | Perishable | Discarded |
| 18 | Perishable | Discarded |
| 12 | Non-perishable | ACK |
| 13 (formerly 16) | Non-perishable | ACK |

Referring to Table 2, assume that the sender has sent packets with sequence numbers from 11 through 18. After it transmits a packet, the sender determines whether the packet needs to be stored in the retry buffer, or can be discarded. Thus, in the sequence illustrated above, packets 11, 12, and 16 must be stored in the retry buffer since the non-perishable bit is set. Packets 13, 14, 15, 17 and 18 are all discarded by the sender after they are transmitted since they are not designated as non-perishable. When the receiver returns an ACK for packet 11, the sender discards that packet from the retry buffer. When the NAK is received for packet 12, the sender begins retransmitting packets contained in the retry buffer. It begins by sending packet 12, which is the packet that was explicitly NAK'd. It then retransmits packet 16, which was the only other packet in the retry buffer. However, since packets must be sent with consecutive sequence numbers, that packet, which formerly was identified by sequence number 16, is renumbered 13 before being retransmitted.

Meanwhile, the receiver, or destination, is processing the packets as they are received. It successfully received packet 11 and therefore sends an ACK for that packet. It then unsuccessfully received packet 12 and thus, sent a NAK. It then discards all incoming packets (13-18) until it receives packet 12 successfully. It then resumes normal operation from that point.

Note that during the retransmission, the packet that was sent using sequence number 16 originally, it now sent using sequence number 13. This is because the replay started with the packet having sequence number 12, and packets must be sent with sequence numbers in consecutive order. In this embodiment, the destination discarded all packets received after the packet in error. Therefore, there is no chance for confusion at the destination between the original packet #13 and the retransmitted packet #13.

The contrast between Table 1 and Table 2 shows the improvements of the present invention. In the first example, the retry buffer had to hold all 7 transmitted packets (#12-#18). However, in Table 2, the retry packet was only required to store 2 packets (#12 and #16). Thus, the size of the retry buffer can be made smaller. Specifically, if NP denotes the ratio of non-perishable packets to the total number of packets, the size of the retry buffer can be defined by:

NP*Replay_Timer*link speed*protocol efficiency, where Replay_Timer is the maximum allowable value of the Replay Timer, the link speed is the raw transmission rate of the media, and the protocol efficiency is the ratio of data bits to total transmitted bits. Note that the value of NP is implementation specific and can substantially impact the required size of the retry buffer. Alternatively, for a given retry buffer size, the NP ratio determines the expected network performance. Higher ratios indicate that most packets must be saved in the retry buffer, thus reducing the number of packets that can be transmitted before the sender is forced to stop while awaiting ACKs.

It is also important to note, in reference to Table 2, that the retransmission latency for packet #16 has also been significantly reduced, since there were much fewer packets that needed to be retransmitted.

Figure 6:
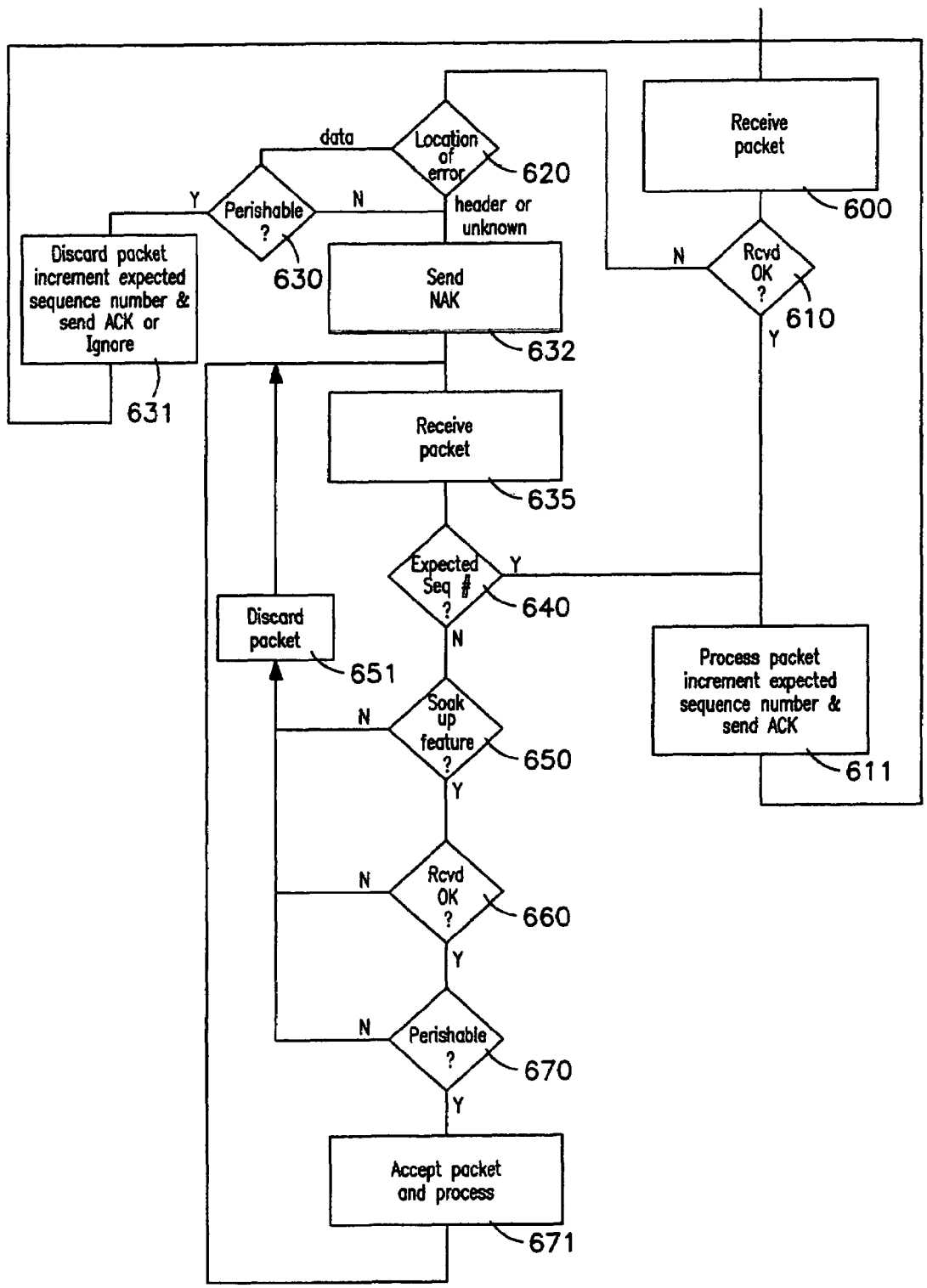
FIG. 6 is a flowchart illustrating a representative embodiment of the destination's action upon receipt of a packet.

FIG. 6 represents a flowchart showing an exemplary process used by the destination. The destination receives a packet, as shown in Box 600. It performs the integrity checks necessary to insure the validity of the packet and then checks if the packet was properly received in Decision Box 610. This check includes verifying the header CRC, the data CRC and comparing the sequence number of the received packet with the expected sequence number. If this packet has been successfully transmitted and arrives in the proper sequence, the destination processes the packet, increments the expected sequence number and returns an ACK (as shown in Box 611).

If, however, the packet contained an error, the destination determines the type of transmission error that occurred in Decision Box 620. If the destination determines that the transmission error was isolated only to the data field (in other words, the header CRC was correct), it then checks the "perishable" bit in Decision Box 630. If the "perishable" bit is set, the destination is able to infer that the sender will not retransmit this packet, even if it were to send a NAK. Furthermore, as can be seen in FIG. 5, the transmission of a NAK will cause the sender to retransmit all non-perishable packets that followed this packet. Thus, to conserve bandwidth and avoid unnecessary retransmissions, the destination simply discards the packet, increments the expected sequence number and returns an ACK (or simply doesn't transmit a response) as shown in Box 631.

Returning to Decision Box 630, if the "perishable" bit is not set, this packet was essential and therefore must be retransmitted. Therefore, the destination returns a NAK to the sender in Box 632. The destination will also send a NAK if the transmission error affected the header, or if the destination is uncertain as to the extent of the transmission error (as shown in the branch from Decision Box 620 to Box 632). In a more conservative embodiment, the receiver would follow the branch from Decision Box 620 to Box 632 when any errors are encountered.

Following the transmission of the NAK, the destination awaits receipt of another packet in Box 635. It then verifies the integrity of the packet and determines whether this is a retransmission of the previous packet for which it had sent a NAK in Decision Box 640. If it is, the processing continues with Box 611.

There are several implementation options that are available to destinations following the receipt of an unsuccessfully transmitted packet. The simplest implementation is simply to ignore all subsequent packets until the destination receives the failed packet again. The second option is to accept the subsequent non-essential packets that arrive after receipt of the failed packet. These are packets which were transmitted by the sender after the failed packet, but before receipt of the NAK from the destination. Knowing that non-essential packets (those with the "perishable" bit set) are subject to packet drop-out (in order delivery with some number of missing packets), the destination can accept these without adversely affecting the higher-level network protocols. Therefore, it is possible, and acceptable, for the destination to absorb any perishable packets that are currently being transmitted. These options are illustrated in Table 3.

TABLE 3

| Seq. No. | Packet Type | Destination response - Option #1 | Destination response - Option #2 |
|---|---|---|---|
| 11 | Non-perishable | ACK | ACK |
| 12 | Non-perishable | NAK - transmission error | NAK - transmission error |
| 13 | Perishable | Discarded | Processed |
| 14 | Perishable | Discarded | Processed |
| 15 | Perishable | Discarded | Processed |
| 16 | Non-perishable | Discarded | Discarded |
| 17 | Perishable | Discarded | Processed |
| 18 | Perishable | Discarded | Processed |
| 12 | Non-perishable | ACK | ACK |
| 13 (formerly 16) | Non-perishable | ACK | ACK |

In Table 3 above, Option #1 is described above in conjunction with Table 2. Option #2 illustrates an alternative embodiment, wherein the destination processes, rather than discards packets with the perishable bit set, even after transmitting a NAK on a previously received packet. Note above that packets 13, 14, 15, 17 and 18 are all marked as perishable. Therefore, the destination is able to process them, since it is acceptable that not all packets arrive for this class of packets. Note also that packet 16, which is marked as non-perishable, must still be discarded, since it is critical that it be received after packet 12.

Note that both options require the same amount of media bandwidth. However, the second option is better able to optimize the utilization of this bandwidth by accepting and processing more packets.

Returning to FIG. 6, if the destination does not have the ability to absorb these packets, it simply discards the incoming packet, as shown in Box 651 and waits for another packet. It will repeat this process until it receives the failed packet to which it sent the NAK in response. However, if the destination has the ability to absorb these non-essential packets, the process continues with Decision Box 660, where the destination validates the receipt of the packet. This packet should have a sequence number greater than that which is expected (since it is a subsequent packet). However, it may not necessarily be the next consecutive number. If, for example, a spurious noise spike appeared on the transmission media, one or more packets may have been destroyed. In this case, the received packet may have a sequence number that is greater than the expected sequence number. The ability of the destination to validate such packets is implementation specific and is contemplated in the present invention. For example, some implementations may only be able to absorb additional packets if the next received packet contains the next consecutive sequence number. Other implementation may be able to recognize sequence numbers a greater distance away.

If the packet is received successfully, the destination then determines whether the packet is perishable in Decision Box 670. If the packet is non-essential, then the destination can process it as shown in Box 671. However, an ACK is not returned since there is still an outstanding NAK. All other scenarios, such as a transmission error or receipt of a non-perishable packet will cause the packet to be discarded as shown in Box 651. This set of steps will be repeated until the sender retransmits the earlier failed packet.

Therefore, through the judicious use of the "perishable" bit, it is possible to increase the distance over which the AS protocol can operate. Specifically, the Replay Timer must be increased to compensate for longer transit times. However, the retry buffer and the retransmission delay are not impacted to the same extent. The above description and figures illustrate the preferred implementation of the present invention. However, it is obvious to those skilled in the art that other embodiments of the present invention are possible.

What is claimed:

1. A device, comprising:
   a first circuit configured to transmit each of a plurality of packets to a destination according to a protocol which defines a perishable bit within packets;
   a storage element configured to store transmitted packets in which said perishable bit is not asserted until said device receives confirmation from said destination that said transmitted packets have been successfully received, and wherein the storage element is configured to not store transmitted packets in which said perishable bit is asserted;
   a second circuit coupled to said storage element and configured to retransmit one or more packets from said storage element to said destination in response to receiving an indication that a particular packet of said transmitted packets that is within said storage element was not correctly received by said destination; and
   a third circuit configured to sequentially renumber a sequence number of packets retransmitted after the particular packet, wherein the packets retransmitted after the particular packet are renumbered beginning with a next higher sequence number than the sequence number of the particular packet.

2. The device of claim 1, further comprising a fourth circuit configured to discard one of said transmitted packets from said storage element when said destination acknowledges receipt of said one of said transmitted packets.

3. The device of claim 1, wherein said indication is a packet received from said destination indicating that said one of said stored packets was not correctly received by said destination.

4. The device of claim 1, wherein said indication is a signal indicating the expiration of a predetermined time period.

5. The device of claim 1, wherein said protocol is the Advanced Switching Interconnect (ASI) protocol.

6. The device of claim 5, further comprising a fourth circuit configured to discard one of said transmitted packets from said storage element when said destination acknowledges receipt of said one of said transmitted packets.

7. A method, comprising:
   a transmitting device transmitting a packet of a plurality of packets to a destination according to a protocol which defines a perishable bit within packets;
   said transmitting device determining whether to store said packet in a retry buffer based on whether said perishable bit is asserted;
   said transmitting device repeating said transmitting and determining for one or more remaining ones of said plurality of packets;
   said transmitting device retransmitting at least one of said plurality packets from said retry buffer to said destination in response to receiving an indication that the at least one packet that is within said retry buffer was not correctly received by said destination; and
   said transmitting device renumbering a sequence number of packets retransmitted after the at least one packet, wherein the packets retransmitted after the particular packet are renumbered beginning with a next higher sequence number than the sequence number of the at least one packet.

8. The method of claim 7, wherein said protocol is the Advanced Switching Interconnect (ASI) protocol.

9. The method of claim 7, farther comprising discarding one of the transmitted packets from the retry buffer in response to the destination acknowledging successful receipt of the one of the transmitted packets.

10. The method of claim 7, wherein said indication is a packet received from said destination indicating that said packet was not correctly received by said destination.

11. The method of claim 7, wherein said indication is a signal indicating the expiration of a predetermined time period.

12. A network device comprising:
   a first circuit for transmitting each of a plurality of packets to a destination device, wherein each of the plurality of packets includes a header having that includes data indicating that the packet is perishable;
   a storage element coupled to the first circuit and configured to store transmitted packets that are indicated by their corresponding headers as not being perishable but not store transmitted packets that are indicated by their corresponding headers as being perishable;
   means for retransmitting one or more packets from the storage element to the destination device in response to receiving a retry indication from the destination device for a particular packet in the storage element, and for sequentially renumbering a sequence number of packets retransmitted after the particular packet, wherein the packets retransmitted after the particular packet are renumbered beginning with a next higher sequence number than the sequence number of the particular retransmitted packet.

13. The network device of claim 12, farther comprising means for discarding one of the transmitted packets from the storage element in response to the destination device acknowledging receipt of the packet.

14. The network device of claim 12, wherein the indication is a packet received from the destination device indicating that the packet was not correctly received by the destination device.

15. The network device of claim 12, wherein the indication is a signal indicating the expiration of a predetermined time period.

* * * * *

UNITED STATES PATENT AND TRADEMARK OFFICE
CERTIFICATE OF CORRECTION

| | | |
|---|---|---|
| PATENT NO. | : 7,653,060 B2 | Page 1 of 1 |
| APPLICATION NO. | : 11/235346 | |
| DATED | : January 26, 2010 | |
| INVENTOR(S) | : David Mayhew et al. | |

It is certified that error appears in the above-identified patent and that said Letters Patent is hereby corrected as shown below:

Column 12

Line 20, please delete "farther comprising" and substitute -- further comprising --.

Line 51, please delete "farther comprising" and substitute -- further comprising --.

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,653,060 B2  Page 1 of 1
APPLICATION NO. : 11/235346
DATED : January 26, 2010
INVENTOR(S) : Mayhew et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1030 days.

Signed and Sealed this

Twenty-third Day of November, 2010

David J. Kappos
*Director of the United States Patent and Trademark Office*